United States Patent [19]

Caldwell et al.

[11] Patent Number: 4,511,987

[45] Date of Patent: Apr. 16, 1985

[54] METHOD OF ENTERING AND PERFORMING OPERATIONS ON COMPLEX NUMBERS ON CALCULATORS

[75] Inventors: David Caldwell; Mahendra P. Agrawal, both of Lubbock, Tex.

[73] Assignee: Texas Instruments Incorporated, Dallas, Tex.

[21] Appl. No.: 361,689

[22] Filed: Mar. 25, 1982

[51] Int. Cl.³ .............................................. G06F 15/02
[52] U.S. Cl. ................................... 364/715; 364/709; 364/731
[58] Field of Search ................ 364/700, 706, 709–710, 364/715–716, 722, 731, 757

[56] References Cited

U.S. PATENT DOCUMENTS

| | | | |
|---|---|---|---|
| 3,720,820 | 3/1973 | Cochran | 235/156 |
| 3,892,958 | 7/1975 | Tung | 364/709 |
| 3,952,187 | 4/1976 | Robinson et al. | 364/731 |
| 4,106,021 | 8/1978 | Katagi | 364/731 |
| 4,121,760 | 10/1976 | Cochran et al. | 364/700 |
| 4,202,039 | 5/1980 | Epenoy et al. | 364/757 |
| 4,208,720 | 6/1980 | Harrison | 364/709 |
| 4,241,412 | 12/1980 | Swain | 364/731 |
| 4,247,902 | 1/1981 | Sado | 364/715 |
| 4,298,949 | 11/1981 | Poland | 364/709 |
| 4,348,733 | 9/1982 | Harrison | 364/709 |

*Primary Examiner*—Jerry Smith
*Assistant Examiner*—Gary V. Harkcom

*Attorney, Agent, or Firm*—Robert D. Marshall, Jr.; N. Rhys Merrett; Melvin Sharp

[57] ABSTRACT

A data processing apparatus employs a single key stroke for defining a complex number entry and for designating a particular complex number calculation mode. Entry of a complex number follows the following format: entry of the first part of the complex number, entry of a complex number mode designation command, and entry of the second part of the complex number. Entry of the complex number mode designation command designates the numeric data to be assigned the first part and the second part of a complex number and also causes the data processing apparatus to enter a corresponding complex number computation mode. Thereafter, upon entry of at least some of the normal operational commands of the data processing apparatus, these operational commands are performed upon the previously entered complex numbers in accordance with the mathematical laws of complex number arithmetic. The data processing apparatus preferably generates an indication of when a complex number computation mode has been set. Display of the two parts of a complex number is facilitated by an exchange operational command which exchanges the first and second parts of the complex number so that the other part of the complex number may be displayed. In a further preferred embodiment, complex numbers may be stored and recalled from pairs of user accessible memories in a manner similar to the normal operations on real numbers.

25 Claims, 7 Drawing Figures

METHOD OF ENTERING AND PERFORMING OPERATIONS ON COMPLEX NUMBERS ON CALCULATORS

BACKGROUND OF THE INVENTION

The present invention relates to data processing apparatuses which include preprogrammed complex number arithmetic functions. This functional capability is most often found in the so called "scientific calculators". These calculators generally include a wide variety of functions in addition to the four basic arithmetic operational functions of addition, subtraction, multiplication and division. These machines typically include a keyboard for entering information and operational commands into the machine and a visual display for communicating an indication of the results to the operator. These machines often include a plurality of user accessible memories. A user acessible memory is a data memory which the operator can selectively address for both storing and recalling data. A user accessible memory may be used for a store operation in which a displayed number is stored in a selected memory, a recall operation in which the number stored in a selected memory is displayed or an exchange operation in which the displayed number and the number in a selected memory are exchanged. Typically, storing and/or recalling data in one of these machines requires a two key stroke sequence, the first sequence indicating the specific store, recall or exchange operation desired and a second key stroke used to designate the particular memory addressed. Such a machine may also include a provision for memory arithmetic as described in the copending U.S. patent application Ser. No. 280,640, of Caldwell et al, entitled "Data Processing Apparatus with Algebraic Memory Operation and Entry Sequence", filed July 6, 1981 allowed Issue Fee paid May 17, 1984.

A problem exists with this type of calculator organization. Firstly, provision of complex number arithmetic functions in such a calculator is not typical. In those calculators in which such complex number arithmetic is supported, the user is often required to enter the parts of the complex number into specifically designated user accessible memory so that the calculator may recall these parts of the complex number in carrying out designated complex number arithmetic.

This type of organization requires concentration of the user to remember, firstly the particular user accessible memories to which each portion of a complex number must be stored and secondly requires the user to know the particular portions of the user accesible memory where the separate parts of the computer results of the complex arithmetic are stored. Typically such a calculator does not give the user any indication of when the calculator is in a complex number computation mode, nor does the calculator give the user any indication of which part of a particular complex number is indicated by the display. Thus much of the usefullness of a calculator in this form of computation is negated by the requirement that the user keep track of many of the functions involved in the complex number arithmetic.

SUMMARY OF THE INVENTION

It is an object of the present invention to provide a single operational command in a data processing apparatus which both designates the respective first and second portions of a complex number and causes the apparatus to enter a complex number computation mode. Entry into such a complex number computation mode thereby redefines the functions of at least some of the operational commands whereby entry of these operational commands performs arithmetic on entered complex numbers in accordance with the mathematical laws of complex number arithmetic.

It is a further object of the present invention to provide a data processing apparatus such as described above which provides an indication to the user of when the apparatus is in a complex number computation mode.

It is a still further object of the present invention to enable entry of an operational command to change the part of the complex number indicated by the apparatus and further to provide an indication of which part of the complex number is currently output.

It is yet a further object of the present invention to enable user accessible store and recall operations with complex numbers based upon storing or recalling the first part of the complex number in accordance with a designated user accessible memory and storing or recalling the second part of the complex number from a user accessible memory paired with the designated user accessible memory.

In the preferred embodiment of the present invention a rectangular complex number mode designation command designates the last entered numeric data as the imaginary part of a complex number and designates the next entered numeric data as the real part of the complex number. This function is performed by displaying a number as it is input, transferring the currently displayed number to one of the working memories of the appartus and zeroing the currently indicated number upon entry of the rectangular complex number designation command. In addition, once this rectangular complex number designation command has been entered then at least some of the normal arithmetic and operational commands of the apparatus are redefined to operate on the complex number having its imaginary part stored in the working memory and its real part currently displayed.

In another preferred embodiment of the present invention a polar complex number designation command is employed to designate the last entered data as the angular part of a complex number and the next entered data as the magnitude part of a complex number. This designation of the two parts of the complex number is performed in the same manner as explained above in regard to the rectangular mode complex number designation commands. In addition to thus designating the entered parts of the complex number, entry of the polar complex number designation command redefines at least some of the arithmetic and operational commands of the apparatus to perform arithmetic on polar form complex numbers. In a further preferred embodiment of the present invention both rectangular and polar mode complex numbers can be entered and operations performed by converting entered polar form complex numbers into rectangular form prior to performing any complex number arithmetic.

BRIEF DESCRIPTION OF THE DRAWINGS

The above and other objects and further aspects of the present invention will become clear from the following description taken in conjunction with the drawings, in which.

DETAILED DESCRIPTION OF THE PREFERRED EMBODIMENT

Figure 1:
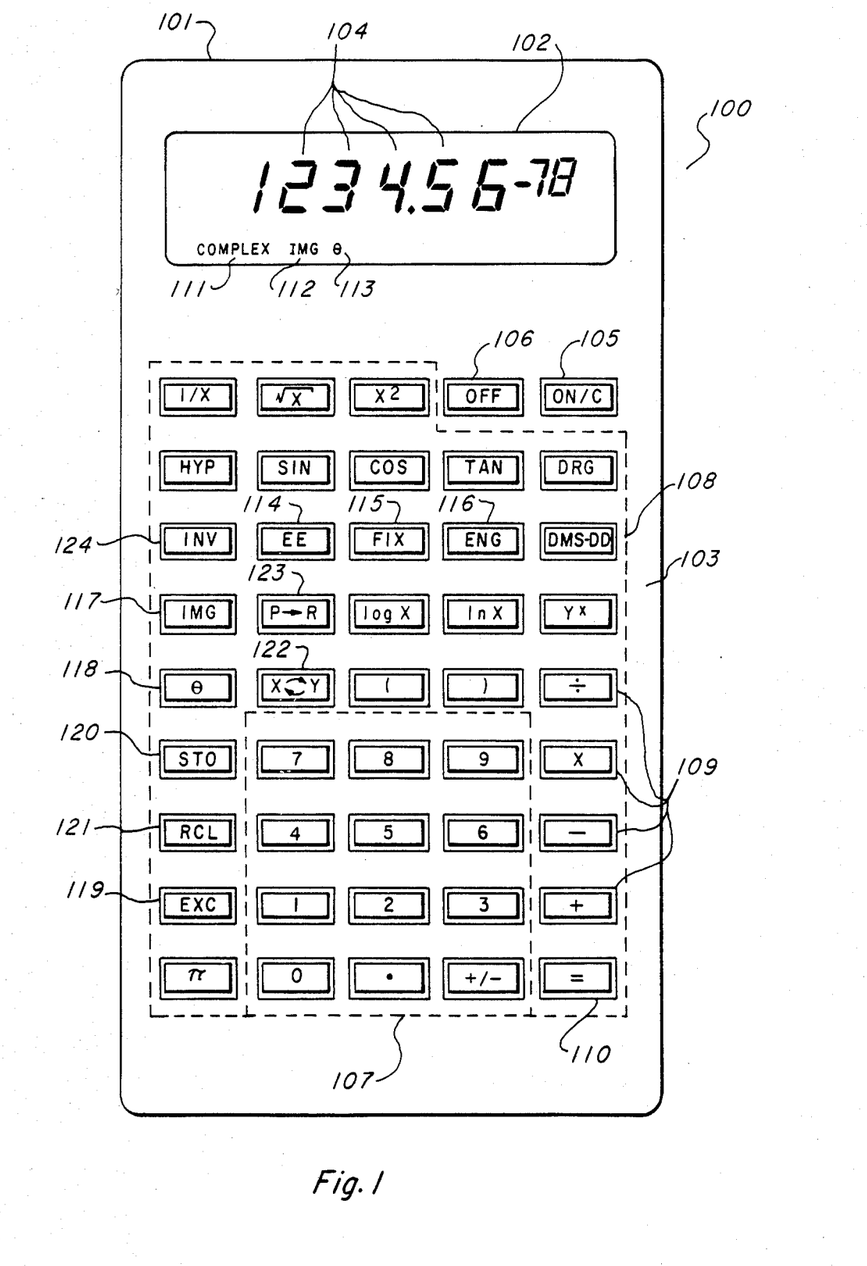
FIG. 1 illustrates the front panel of a data processing apparatus in accordance with the present invention.

FIG 1 illustrates the front panel of the case of a data processing apparatus which is the subject of the present application. As illustrated this data processing apparatus is conventionally known as a scientific calculator. The name scientific calculator applies generally to hand-held or desk top machines which perform mathematical operations from inputs from a keyboard and which supply a visual display which is the output of the results.

FIG. 1 shows the front panel of data processing apparatus 100 which illustrates substantially all of the machine/user interface components. Data processing apparatus 100 includes case 101, display 102 and keyboard 103.

Display 102 includes a plurality of seven segment digits 104. the digits 104 are primarily employed to provide a visual output of the numerical results calculated by the machine. In addition, a data processing apparatus of this type typically also generates an output indication of input data as it is input and may also indicate the operational state of the machine. Such indications commonly include whether one of the function control keys has been depressed, the current angular calculation mode of the machine and may also include some indication of an error condition for an unpermitted input sequence or operation. While the preferred embodiment of display 102 employs seven segment digits, it would be clear to those skilled in the art that a dot matrix display capable of generating visible characters is equally applicable to this invention. It would also be clear to one skilled in the art that the essential function is communication of the numerical results to the operator and that a variety of means may be used to achieve this purpose.

User input of data and operational commands to the data processing apparatus is made by a keyboard 103. Keyboard 103 is employed for entry of numeric data and operational commands into data processing apparatus 100. Keyboard 103 is made up of a plurality of momentary contact key switches, each of these key switches having a predefined function. On/Clear key 105 is employed to turn the data processing apparatus on if the apparatus is turned off. If the apparatus is turned on, On/Clear key 105 functions to clear the number displayed by display 102 in order to enable input of new numerical data or in order to enable input of corrected numerical data in the case that the operator makes a mistaken entry. Off key 106 is employed to turn data processing apparatus 100 off.

Keyboard 103 includes a plurality of numerical input keys 107. These numerical input keys 107 includes the decimal digits 0 to 9, a decimal point and a sign control key. Together these 12 keys are employed to enter numerical data into the machine to provide the required operands for the mathematical functions to be performed.

Keyboard 103 further includes a plurality of operational/functional command keys 108. Operational/functional command keys 108 enable the user to input to the machine commands for performing the desired operations and functions. Operational/functional command keys 108 include the basic functions of addition, subtraction, multiplication and division indicated by the basic function keys 109. Operation and function command keys 108 also includes an equal sign key 110 which enables completion of an entered algebraic expression, thereby commanding the machine to compute the desired result from the entered data and the entered commands. Typically, data processing apparatus 100 includes a plurality of other operational/ functional command keys 108 such as illustrated for performing a variety of other types of calculations.

Keyboard 103 includes EE key 114, FIX key 115 and ENG key 116 which are employed to control data input and output format. When entering data, EE key 114 enables entry of exponential values in scientific mode. Upon depression of EE key 114 any further digits 107 are placed in the exponent. Depression of FIX key 115, followed by depression of one of the digit keys, places the display in a fixed decimal point format. Thereafter the number indicated by display 102 will display the designated number of digit places to the right of the decimal point. Display of a number in a fixed decimal format may require addition of trailing zeroes or truncation and/or rounding depending on the number and the designated number of places. Depression of ENG key 116 places the display in engineering notation. Thereafter the number indicated by display 102 will display a mantissa between 1 and 999 and an exponent which is a factor of 3. Display in engineering notation may also require trailing zeroes or truncation and/or rounding.

Display 102 of data processing apparatus 100 includes additional visual indicators 111, 112 and 113 for communicating the operational state of the machine. Upon entry into a complex number computation mode complex indicator 111 is activated. This provides a visual signal to the operator that the apparatus is in a complex number computation mode. In addition to actuation of complex indicator 111, one of the complex mode indicators 112 and 113 is also actuated. If the apparatus is in a rectangular complex number computation mode then IMG mode indicator 112 is actuated. However, if the data processing apparatus is in a polar complex number computation mode then theta mode indicator 113 is actuated. In addition, if the first and second parts of a complex number, either a newly entered complex number or a complex number resulting from calculation, have been exchanged so that the first part of the complex number is currently displayed, then the appropriate mode indicator 112 or 113 or the complex indicator 111 is placed in a blinking mode in order to alert the user that the parts of the complex have been exchanged.

As an alternative, IMG mode indicator 112 may be eliminated. In such an embodiment actuation of complex indicator 111 indicates that the apparatus is in a rectangular complex number computation mode unless theta mode indicator 113 is also actuated. If both indicators 111 and 113 are actuated, then the apparatus is in a polar complex number computation mode. It should be understood that the essential feature is that display 102 generate an unambiguous indication of the complex number computation mode.

Keyboard 103 includes further operational/functional command keys 108 which are particularly employed in the present invention. IMG key 117 is employed in a manner which will be more fully disclosed below to designate the parts of a rectangular complex number and to cause the data processing apparatus 100 to enter a rectangular complex number computation mode. Similarly, theta key 118 is employed to designate a polar form complex number and to enter a polar complex number computation mode. Exchange key 119 is employed in conjunction with the appropriate mode designation key 117 or 118 to exchange the first and second parts of the complex number so that both parts of the complex number may be viewed by the operator.

A further subset of operational functional command keys 108 control the storage and recall of data from the user accessible memories. Exchange key 119, store key 120 and recall key 121 are the input commands employed for this purpose. The present invention is applicable to data processing apparatuses 100 which employ a plurality of user accessible memories. In order to store information within a particular user accessible memory the operator first depresses store key 120 and then one of a plurality of memory designation keys which corresponds to the desired memory. The same sequence is also employed using recall key 121 and a memory designation command in order to recall information from a user accessible memory. In addition the data displayed may be exchanged with the data in particular user accessible memory employing exchange key 119 followed by a memory designation key.

In the data processing apparatus 100 illusrated in FIG. 1, designation of a particular user accessible memory desired is via numerical keys 107. Thus, by depressing the store key 120 and the numerical key 5, the currently displayed data would be stored in the memory designated by 5. Similarly, depressing of recall key 121 followed by depression of a numerical key 3 would result in the recall and display of the data stored in the memory designated 3. As will be further explained below, exchange key 119, store key 120 and recall key 121 may be employed in a complex number mode to store and recall complex numbers in regard to the particular user accessible memory designated and another user accessible memory paired with the designated user accessible memory. It should be understood that other data processing apparatus may employ a plurality of alphabetic keys (such as A, B, C, D, etc.) to designate the particular user accessible memory addressed. The present invention is equally applicable to the case in which alphabetic memory designator keys are employed.

Figure 2:
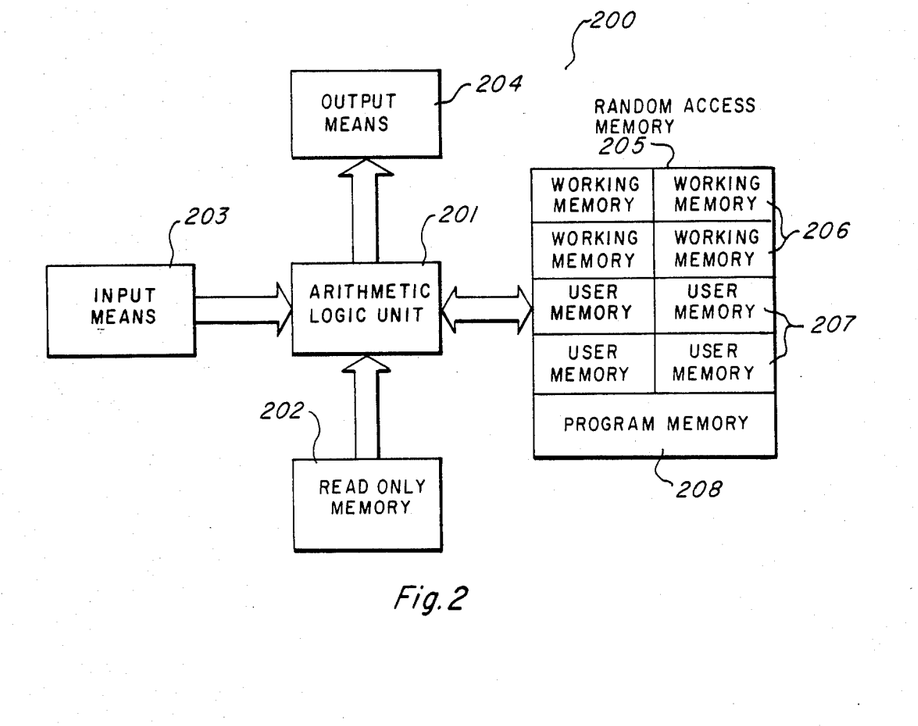
FIG. 2 illustrates a block diagram of the circuitry employed in a data processing apparatus in accordance with the present invention.

FIG. 2 illustrates a block diagram of data processing apparatus 200 which may be used to embody the present invention. Central to the functioning of data processing apparatus 200 is arithmetic logic unit 201. Arithmetic logic 201 performs all of the computation and control functions necessary for the operation of data processing apparatus 200. The operation of arithmetic logic unit 201 is controlled by a read only memory 202 in conjunction with data and command inputs from input means 203. Input means 203 is typically embodied by keyboard 103 illustrated in FIG. 1. Read only memory 202 preferably includes a plurality of instruction words which are sequentially applied to arithmetic logic unit 201 thereby causing it to perform desired operations. These desired operations typically include so called "overhead" functions. These overhead functions would typically include periodically checking the condition of input means 203 to determine whether an input signal is generated, decoding any received input signal to determine the next operation to be performed, and generation of signals for output via output means 204. Output means 204 is typically embodied by display 102 illustrated in FIG. 1. The instruction words stored in read only memory 202 are generally in machine code, that is each instruction word commands arithmetic logic unit 201 to perform a single simple operation. Groups of instruction words are read out of read only memory 202 in accordance with the particular inputs received from input means 203 to cause arithmetic logic unit 201 to perform each of the functions of the command keys 108 illustrated in FIG. 1. In performing these commanded functions arithmetic logic unit 201 sends data to random access memory 205 for operation therein. In accordance with the groups of instruction words stored in read only memory 202 arithmetic logic unit 201 addresses various portions of random access memory 205. Thus random access memory 205 is partitioned into several types of memory units in accordance with the instructions of read only memory 202.

Random access memory 205 includes a plurality of working memories 206 which are employed to store the pending operands applied to arithmetic logic unit 201, an indication of entered but unperformed commands and various calculated intermediate values. Working memories 206 may also be used as address pointers to store the address of particular instruction words in read only memory 202. This use would typically include the storage of the address of a return point in read only memory 202 during execution of a subroutine. Typically one of the working memories 206 is employed to store the data which is output via output means 204. This is accomplished by read only memory 202 commanding arithmetic logic unit 201 to read out the data stored in this particular working memory and to apply appropriate signals to output means 204 to cause output means 204 to generate an indication of this data.

In the data processing apparatus 200 of the present invention random access memory 205 also includes a plurality of user accessible memories 207. As explained above in conjunction with the description of the operation of exchange key 119, store key 120 and recall 121, upon entry of appropriate inputs from input means 203, read only memory 202 causes arithmetic logic unit 201 to transfer data between the working memory 206 associated with the output and a selected one of the user accessible memories 207.

Random access memory 205 may also include a program memory 208. Program memory 208 is employed for storing a set of a plurality of input commands from input means 203. This set of input commands is stored in programmed memory 208 by the user by selection of appropriate input commands from input means 203 in order to enable the data processing apparatus 200 to perform a user selected series of commands. Typically the program steps stored in program memory 208 each correspond to one of the command keys 108 which generate the input signals from input means 203. Thus each of these program steps in program memory 208 selects a group of instruction words in read only memory 202 for applying the desired instructions to arithmetic logic unit 201 in order to perform the selected function.

By adopting this form of construction, data processing apparatus 200 becomes in effect a miniature programmed digital computer. By proper selection of the instruction words permanently stored in read only memory 202 during the manufcture of the data processing apparatus 200, the manufacturer may provide a selected group of preprogrammed functions which are enabled by proper inputs from input means 203. Because a typical data processing apparatus 200 has arithmetic logic unit 201, read only memory 202 and random access 205 embodied in a single integrated circuit chip, the instruction words sorted in read only memory 202 may be changed by changing a single manufacturing step in the integrated circuit construction. Thus an entirely new data processing apparatus 200 may be constructed which performs an entirely new set of functions without the necessity for completely redesigning the generalized computer like structure of the apparatus.

The operation of the data processing apparatus of the present invention will now be described in conjunction with the flow charts illustrated in FIGS. 3, 4, 5, 6 and 7. It is understood that these flow charts illustrate the general steps in the operation of data processing apparatus 200 and are not intended to illustrate the exact programs stored in read only memory 202. It should be understood that one skilled in the art of design of such data processing apparatuses would be able to provide the proper exact program to be stored in read only memory 202 to perform the functions illustrated in the flow charts of FIGS. 3, 4, 5, 6, and 7 once selection is made of the particular arithmetic logic unit 201 to be employed with its particular instruction set.

Figure 3:
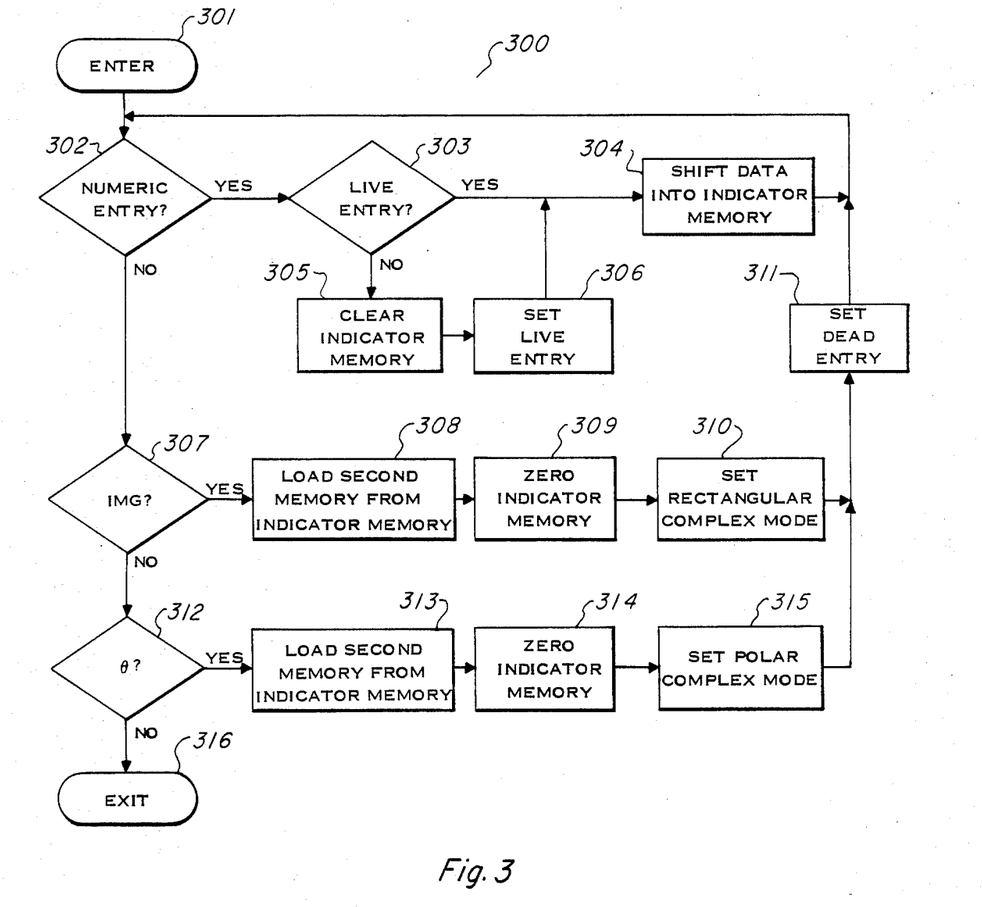
FIG. 3 illustrates a flow chart of the operation of the data processing apparatus in accordance with the complex number entry format of the present invention.

FIG. 3 illustrates a flow chart of the operation of a data processing apparatus in accordance with the present invention particularly describing the operation of the means for entry into complex number modes. It should be understood that the operations illustrated in FIG. 3 represents only a portion of the operations performed by data processing apparatus 200. Additional operations performed by data processing apparatus 200 are conventional in nature and will not be further described herein. It should also be understood that the flow chart illustrated in FIG. 3 represents a preferred embodiment of the general steps employed in operation of a data processing apparatus in accordance with the present invention and is not intended to illustrate the only manner in which the present invention may be practiced. In addition, it should be understood that the flow chart of FIG. 3 illustrates only the overall general steps of the operation of the present invention and is not intended to illustrate the exact detailed machine operations required to practice this invention.

FIG. 3 illustrates program 300. Program 300 is begun via entry block 301. Program 300 first tests to determine whether a numeric entry, such as generated by depression of one of numerical input keys 107, is entered (decision block 302). If a numeric entry has been received then program 300 tests to determine whether the data processing apparatus is in live entry mode (decision block 303). If the data processing apparatus is in live entry mode then the received numeric entry is entered into the working memory 206 which is employed to store the currently output data. Hereinafter this particular working memory 206 will be designated the indicator memory. Data processing apparatuses of the type employed in the present invention typically enable entry of numeric data starting with the most significant digit and therefore entry of an additional digit is accomplished by shifting the previously received digits one place to the left and entering the just received digit in the least significant digit position. It is also clear that entry of a decimal point or entry of a change sign command also alters the data stored within indicator memory in a manner determined by the key depressed. Once this entry into the indicator memory is accomplished the program 300 returns to decision block 302.

In the event that the data processing apparatus is not in the live entry mode then the indicator memory is cleared, that is the data stored therein is erased and a zero is stored instead (processing block 305). Thereafter the apparatus sets the live entry mode (processing block 306). Next the program 300 proceeds with processing block 304 in which the last received numeric entry is entered into the indicator memory. In such a case the previously received numeric entry is entered into the indicator memory in the first digit position. Thereafter the program 300 returns to decision block 302 in a manner described above. Actuation of EE key 114 causes any further entered digits to be placed in the exponent of a number expressed in scientific rotation. Numeric entry using scientific notation is conventional and this function is not illustrated in program 300.

In the event that a numeric entry has not been received, then program 300 tests to determine whether the IMG key 117 has been depressed (decision block 307). If such an IMG command has been received then the data processing apparatus proceeds to transfer the data currently stored in the indicator memory into another one of the working memories 206 of the data processing apparatus 200 (processing block 308). This particular one of the working memories 206 will hereinafter be designated the second memory, because it is employed to store a one of the two parts of a complex number. After transfer of the data stored in the indicator memory to the second memory, the indicator memory is zeroed, that is a zero is stored in the indicator memory (processing block 309). Next program 300 sets the data processing apparatus into a rectangular complex number computation mode (processing block 310). Setting the data processing apparatus into the rectangular complex number computation mode has two effects. Firstly, at least some of the operational commands 108 are redefined to operate upon complex numbers rather than operating in the normal real number mode. This particular feature will be further described below in conjunction with FIG. 4. In addition to this redefinition of some of the operational functions of the data processing apparatus, setting the data processing apparatus into the complex number computation mode causes actuation of certain of the indictors of display 102. Upon depression of IMG key 117 the complex mode indicator 111 is actuated. This gives a visual indication to the operator that the data processing apparatus is in a complex number computation mode. In addition, IMG mode indicator 112 is also actuated. This gives the operator a further indication that the data processing apparatus is in the rectangular complex number mode by indicating that the imaginary part of a complex number has been entered. As an alternative embodiment, actuation of complex mode indicator 111 alone may unambiguously designate the rectangular complex number computation mode as a default condition. This feature eliminates the need for IMG mode indicator 112. Program 300 next sets dead entry (processing block 310) and then returns to decision block 302.

In the case that a IMG operational command has not been received, then the data processing apparatus checks to determine whether a theta operational command has been received (decision block 312). If such a theta operational command has been received then the data processing apparatus stores the data currently in the indicator memory in the second memory (processing block 313) and zeros the indicator memory (processing block 314). This operation is the same as the operation described above in conjunction with the IMG key 117. In the same manner as described above, one portion of a complex number, in this case the angular portion of a polar form complex number, is entered into the second memory and the indicator memory is cleared for entry of the other portion of the complex number, in this case the magnitude. In a manner similar to that described above in conjunction with the IMG key 117, depression of theta key 118 sets the data processing apparatus into a polar complex number computation mode (processing block 315). Setting the data processing apparatus into the polar complex number computation mode achieves two purposes. Firstly, the subset of the operation keys 108 which are applicable to complex number arithmetic are thereby redefined to perform complex number arithmetic in the polar form. In addition, complex mode indicator 111 is actuated as well theta mode indicator 113. Actuation of these two mode indicators gives the operator a visual indication that, firstly the data processing apparatus is in a complex number mode and secondly that the data processing apparatus is in a polar complex number computation mode by the indication that the angular part of a complex number has been entered. Next program 300 proceeds to set dead entry (processing block 311) and returns to decision block 302. In the case that theta key 118 has not been depressed, then the portion of the total data processing apparatus program illustrated in program 300 is not applicable and therefore program 300 is exited via exit block 316.

Figure 4:
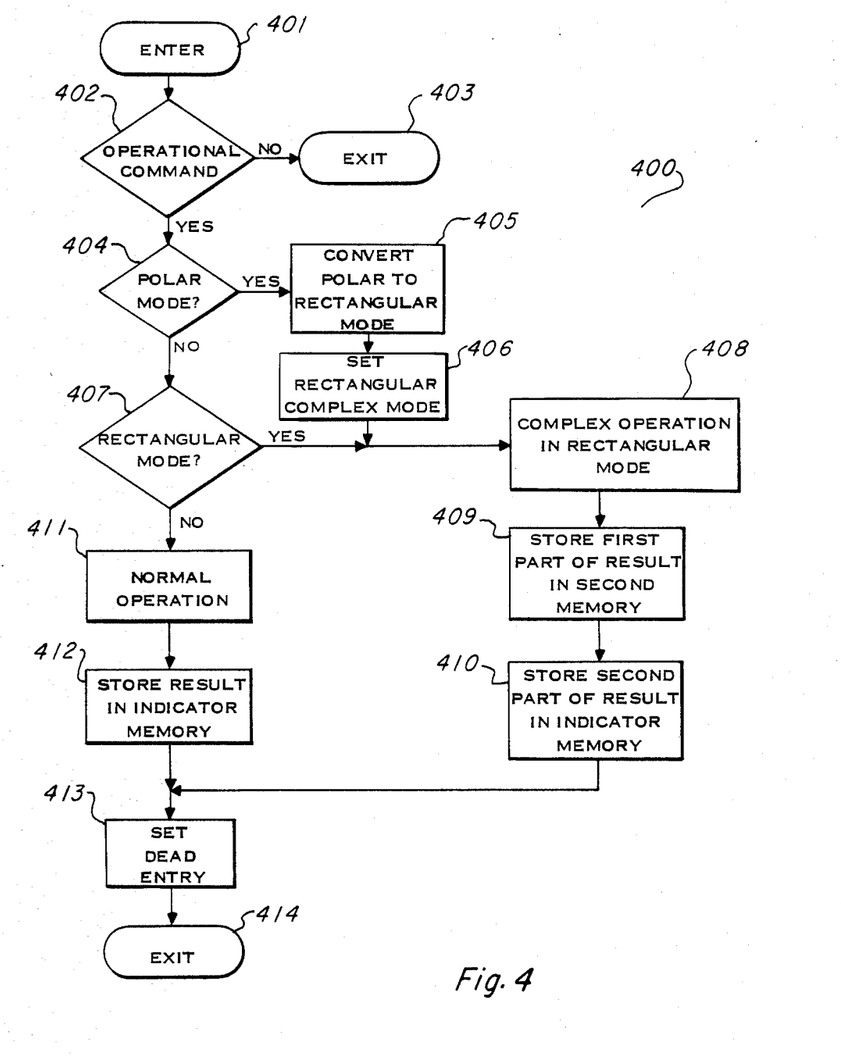
FIG. 4 illustrates a flow chart of the operation of a data processing apparatus on normal and complex number arithmetic in accordance with the present invention.

FIG. 4 illustrates the operation of the data processing apparatus particularly in conjunction with the operation of the redefined functional commands when the data processing is in a complex number computation mode. As in the case of the flow chart illustrated in FIG. 3, FIG. 4 illustrates only the general steps of a preferred embodiment of the present invention and is not intended to illustrate either the exact details of this operation or to exclude other manners of operating in accordance with the teachings of the present invention.

FIG. 4 illustrates program 400. Program 400 is entered via enter block 401. Program 400 first tests to determine whether an operational command has been received (decision block 402). In the case in which an operational command has not been received, then program 400 is inapplicable and thus program 400 is exited (exit block 403).

In the case in which an operational has been received, then program 400 tests to determine whether the data processing apparatus is in a polar complex number computation mode (decision block 404). In the event that the data processing apparatus is in a polar complex number computation mode then program 400 causes the previously entered polar form complex numbers to be converted into rectangular form. A polar form complex number is expressed in the form $Me^{i\theta}$ or the alternative form $M \sin \theta + iM \cos \theta$ where M designates the magnitude part of the polar form complex number and theta designates the angular part of the polar form complex number. In the preferred embodiment of the present invention, it has been found convenient to perform all complex number arithmetic in rectangular complex computation mode. In order to achieve this it is necessary to convert entered polar form complex numbers into rectangular form complex numbers prior to performing any computation. Therefore, the entered polar form complex number is converted to rectangular form (processing block 405). This conversion is achieved according to the following formula;

$$R = M \sin \theta$$

$$I = M \cos \theta$$

in which R is the real part of the rectangular form complex number and I is the imaginary part of the rectangular form complex number. For the purpose of this computation the data stored in the second memory is assumed to be the angular part of the polar form complex number and the data stored in the indicator memory is assumed to be the magnitude part of the polar form complex number. Once this computation is complete then the imaginary part I of the converted complex number is stored in the second memory and the real part R of the complex number is stored in the indicator memory. After the conversion of the entered form complex number into rectangular form the rectangular complex number computation mode is set (processing block 406).

In the event that the data processing apparatus is not in the polar complex number computation mode, program 400 tests to determine whether the data processing apparatus is in the rectangular complex number computation mode (decision block 407). In the event that the apparatus is in the rectangular mode, either via entry of rectangular form complex numbers or via conversion of an entered polar form complex number, then the data processing apparatus performs the entered operational command in the rectangular complex number computation mode (processing block 408). As an example, addition and multiplication of two complex numbers is achieved in accordance with the following formula;

$$(R1+iI1)+(R2+iI2)=(R1+R2)+i\times(I1+I2)$$

$$(R1+iI1)\times(R2+iI2)=(R1R2-I1I2)+i\times(R1I2+R2I1)$$

wherein R1 and I1 are the respective real and imaginary parts of the first complex number and R2 and I2 are the respective real and imaginary part of the second complex number. Complex number operation in accordance with other operational commands such as multiplication, division, exponentiation and so forth are well defined mathematical terms and therefore many of the operational commands keys 108 illustrated in FIG. 1 may be applied to complex number arithmetic. Once the complex number arithmetic is performed, the imaginary part of the result is stored in the second memory (processing block 409) and the real part of the result is stored in the indicator memory (processing block 410). Permitted complex number operations optionally includes both two operand functions, like addition, subtraction, multiplication and division, and single operand functions, like the trigonometric and logrithmic functions. Any of the operational/functional commands 108 which has a defined, unambiguous result for a complex number may be included within the set of operations redefined for complex numbers. In particular, display of each part of a complex number in a fixed decimal format by actuation of FIX key 115 or in an engineering notation by actuation of ENG key 116 may optionally be included within the functions redefined for complex numbers. Likewise operand exchange key 122, normally employed for exchanging the order of previously entered numeric data operands by exchanging the numeric data stored in particular working memories 206, can be employed for complex numbers. In such a case entry into a complex number computation mode would redefine the particular working memories 206 and the data exchange operation so that the first part of the first complex number operand is exchanged with the first part of the second complex number operand, and likewise the second parts of the complex numbers are exchanged upon depression of operand exchange key 122.

In the event that neither the polar complex number computation mode nor the rectangular complex number mode has been set, the data processing apparatus performs the entered operational command in a normal mode in accordance with the arithmetic of real numbers (processing block 411). The result of this operation is then stored in the indicator memory (processing block 412). After performing an operation either in normal mode or in a complex number mode the program 400 sets dead entry (processing block 413) and then program 400 is exited (exit block 414).

Entry of complex numbers in the manner illustrated in FIG. 3 and operation upon complex numbers in the manner illustrated in FIG. 4 has been found to be a particularly convenient manner of complex number arithmetic. Particularly in the rectangular complex number computation mode, it is a convenient manner to perform computations using mixed complex, real and pure imaginary numbers. Rectangular form complex numbers are entered by first entering the imaginary part, depressing IMG key 117, and lastly, entry of the real part. In the event that a real number is to be entered, normal entry of the real number into the indicator memory without depression of IMG key 117 places the number in the indicator memory where the real part of a complex number would be stored. When in the rectangular complex number computation mode, it must be understood that the second memory must be cleared whenever a new complex number is to be entered, such as after entry of an operational command prior to entry of the equal sign key 110. Thus the data processing apparatus would automatically store a zero as the imaginary part of a newly entered number, and complex number arithmetic would be performed employing a mixture of complex and real numbers in accordance with the proper mathematical formula. This operating sequence differs from previous calculator operating sequences in that it is not necessary to enter a zero into the memory storing the imaginary part of a complex number in order to enter a real number when in a complex number computation mode. In addition, the provision that the indicator memory is zeroed upon entry of IMG key 117, enables entry of a pure imaginary number without the necessity for entering a zero into the memory storing the real part. This is because after entry of the imaginary part and depression of IMG key 117, the imaginary part is defined as the data within the second memory and the real part as the data within the indicator memory, which is zero. Thus use of the above described rectangular form complex number entry sequence permits advantageous mixed complex arithmetic including complex numbers, real numbers and pure imaginary numbers with a minimum of required operator key strokes.

It should also be understood that automatic conversion from polar form to rectangular form illustrated in program 400 of FIG. 4 is a convenient design choice rather than a requirement. That is, it is not necessary to perform all of the complex number arithmetic in rectangular form and convert entered polar form complex numbers into rectangular form. Rather, it is possible to perform complex number arithmetic on entered polar form complex numbers in polar form. Use of polar form is particularly convenient in multiplication and division as opposed to addition and subtraction which is more convenient in rectangular form. However, as explained above, as a design choice in order to minimize the necessary storage space within read only memory 202 required for defining these functions, the perferred embodiment converts entered polar form numbers into rectangular form prior to computation.

Operation in complex number arithmetic may be achieved in accordance with the type of operational sequence employed in the normal operations. Data processing apparatus 200 may be programmed to operate only upon chain calculations, that is by performing each entered operation prior to performing the next entered operation, or upon a hierarchical system such as described in U.S. Pat. No. 3,720,820. The electronic calculator disclosed in U.S. Pat. No. 3,720,820 makes no provision for inclusion of parenthesis keys and for achieving a mathematical hierarchy differing from the ordinary mathematical hierarchy. However, the teaching of the present application is equally applicable to a system which performs complex number arithmetic in accordance with an operating system employing parentheses such as described in U.S. Pat. No. 4,208,720. Operating complex number arithmetic in accordance with an algebraic operating system such as disclosed in the above cited U.S. Pat. No. 4,208,720 would necessarily require the use of twice the number of working memories 206 for storing intermediate products and storing entered complex numbers upon which operations had not yet been performed. Therefore, it has been found convenient in the data processing apparatus of the present invention to reduce the number of working memories 206 employed by operating in accordance with chain arithmetic. This limitation is predicated upon a particular design choice limiting the number of working memories employed in the particular data processing apparatus upon which this complex number arithmetic is implemented and should not serve as a limitation to the teachings of the present invention.

It is also believed that the disclosed complex number entry format and the corresponding complex number computation modes are equally applicable to a data processing apparatus which operates in accordance with the reverse Polish notation. In such a case, depression of one of the complex number mode designation commands would perform the entry in the manner set forth above. Later depression of the enter key would cause both the first and second parts of the complex number to be bumped up in the reverse Polish notation operational stack to a pair of new working memories. Operation in a complex number computation mode would require use of two working memories for the respective parts of the complex numbers for each level of the reverse Polish notation operational stack. Thereafter operation upon the entered complex numbers would take place in a manner fully consistent with that disclosed above.

Figure 5:
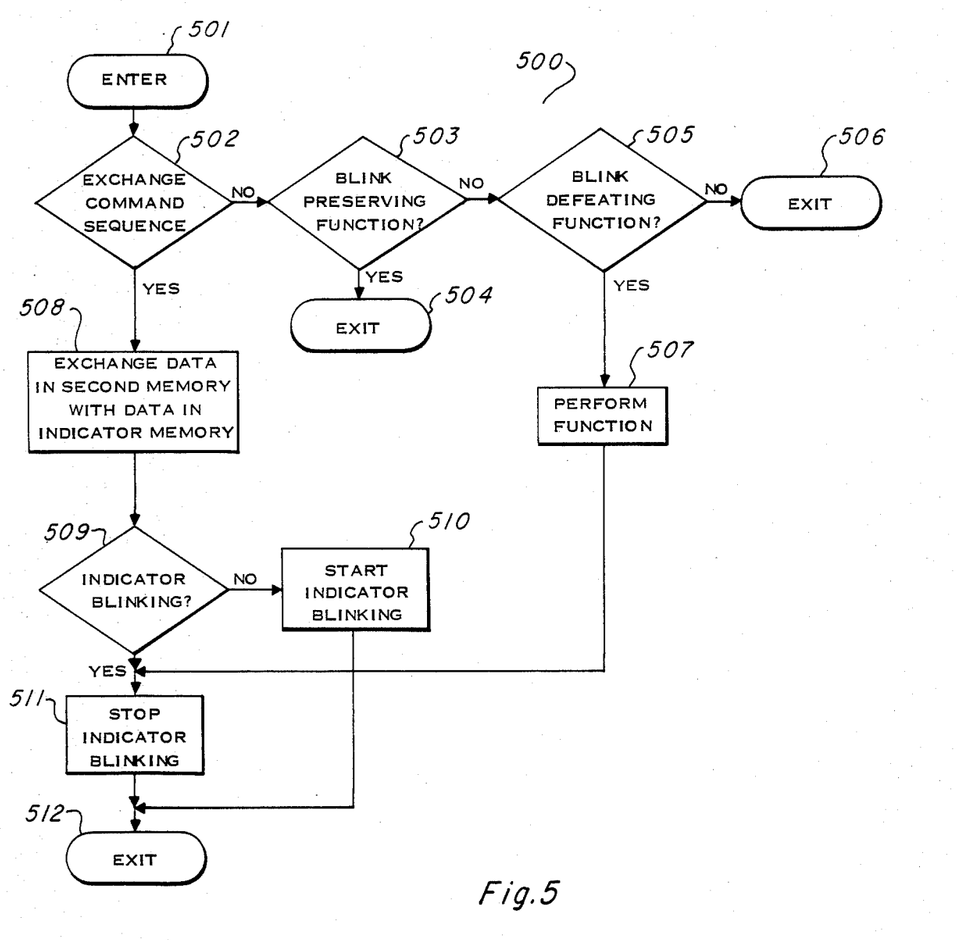
FIG. 5 illustrates a flow chart of the operation of a data processing apparatus in accordance with the present invention which provides an exchange command for exchanging the part of the complex number displayed.

FIG. 5 illustrates a flow chart of a manner in which the other part of a complex number may be placed in the indicator memory for communication to the operator. In the case of the program illustrated in FIG. 500 it is assumed that the data processing apparatus is in a complex number computation mode and that one part of the complex number is stored in the second memory and the other part of the complex number is stored in the indicator memory thereby being displayed to the operator.

Program 500 is entered via entry block 501. Program 500 first checks to determine whether an exchange command has been received (decision block 502). If an exchange command has not been received then program 500 tests to determine if a blink preserving functional command has been entered (decision block 503). If such a function has been entered then program 500 is no longer applicable and is exited via exit block 504. Blink preserving functions are functions of the type which change the display format without disturbing the values stored such as depression of FIX key 115 followed by a numeric digit, depression of ENG key 116 or the like. In addition other types of functions which do not disturb the data such as clearing memories, changing angular modes or the like are also blink preserving functions. These are called blink preserving functions because their operation does not change the sense of the complex number stored in the indicator memory and the second memory as to disturb the indication of exchanged parts of the complex number.

Program 500 next tests to determine if a blink defeating functional command has been entered (decision block 505). A blink defeating function is a function which so changes the data stored in the indicator memory and the second memory as to make inapplicable the blinking indication of exchanged complex number parts. Most arithmetic operator keys are blink defeating functions. If such a blink defeating functional command has not been entered, the program 500 is exited via exit block 506 because it is inapplicable. If such a blink defeating functional command has been entered, this function is performed (processing block 507) in accordance with the previously described process of program 400. Thereafter program 500 proceeds to processing block 511, where the indicator blinking operation is stopped.

In the event that an exchange command has been received then program 500 causes the exchange of the data stored within the second memory with the data stored within the indicator memory (processing block 508). An exchange command includes depression of exchange key 119 followed by depression of IMG key 117 or theta key 118, depending on the current complex number computation mode of the data processing apparatus. This serves to reverse the working memories wherein the first and second parts of the complex number are stored. This serves to place the other part of the complex number not previously displayed into the indicator memory where it may be displayed.

Program 500 next checks to determine whether the data processing apparatus is in an indicator blinking mode (decision block 509). It will be recalled in regard to complex number mode indicators 111, 112, and 113 that it is desirable to indicate whether the displayed number is the first part or the second part of the complex number. In an ordinary mode the first part of the complex has previously been stored in the second memory and the second part of the complex number is stored in the indicator memory. Thus the second part of the complex number is normally displayed. However, upon entry of an exchange command the first part of the complex number appears in the indicator memory and is displayed. In such a case it is necessary to provide an indication to the operator that the positions of the two parts of the complex number have been exchanged. In the preferred embodiment this is performed by periodic actuation and deactuation of complex indicator 111 or of the appropriate complex number mode indicator 112 or 113. This periodic actuation and deactuation causes the particular mode indicator to blink. In the case in which the apparatus is in the rectangular complex number computation mode then IMG mode indicator 112 may thus be set to blinking. In the event the data processing apparatus is in the polar complex number computation mode, then theta mode indicator 113 may thus be set to blinking. Optionally, complex mode indicator 111 may be set to blinking in the case of either selected complex number computation mode. Use of the later blinking mode is of particular value when the optional embodiment eliminating the IMG mode indicator and providing that actuation of complex indicator indicates the default condition of the rectangular complex number computation mode is employed. Therefore, in the case in which the indicator is not blinking then this indicator is set to start blinking (processing block 510). However, in the case in which the indicator is already blinking, indicating that the contents of the second memory and the indicator memory have previously been exchanged then operation of the exchange key places these parts of the complex number in their normal position. Therefore the corresponding indicator is taken out of the blinking mode (processing block 511). After either of these operations program 500 is exited via exit block 512.

It should be understood that providing a blinking indicator to communicate the exchange of the two parts of the complex number is merely a convenient design choice. Other methods of indicating this machine state, such as provision of an addition mode indicator, are equally within the present invention.

Figure 6:
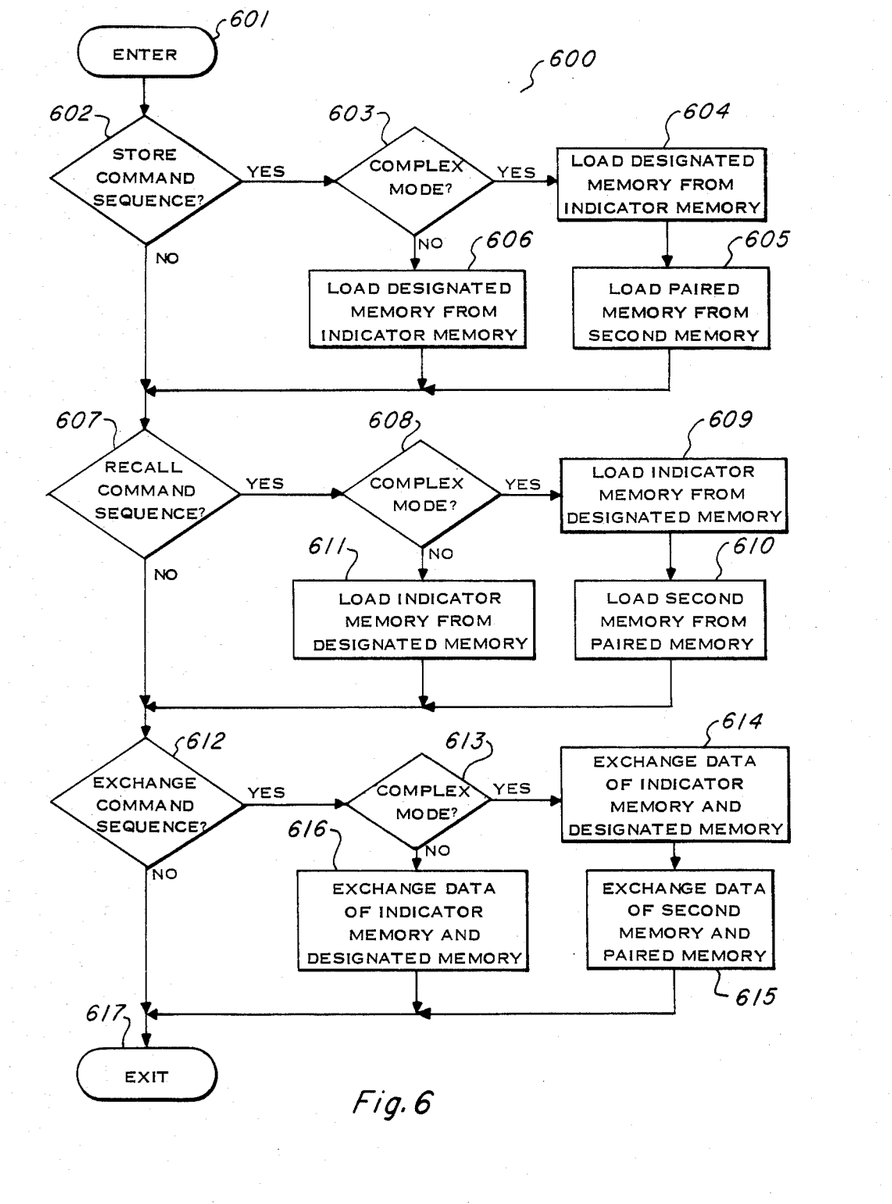
FIG. 6 illustrates a flow chart of the operation of a data processing apparatus in accordance with the present invention for memory store and recall functions.

FIG. 6 illustrates the operation of an exchange command sequence, a store command sequence and a recall command sequence in accordance with the complex arithmetic of the present invention. As in the cases of the programs illustrated previously in FIGS. 3, 4, and 5, the program 600 illustrated in FIG. 6 is intended as a description of the broad steps taken in a preferred embodiment of the present invention. This program illustrated in FIG. 6 is not intended to illustrate the detailed steps of the operation of the data processing apparatus nor is it intended limit the manner of exercise of the present invention.

FIG. 6 illustrates program 600. Program 600 is entered via entry block 601. Program 600 first determines whether a store command sequence has been entered (decision block 602). In accordance with the teachings above entry of a store command sequence requires depression of store key 117 and depression of a numeric digit key for designation of a particular memory. As noted above, the preferred embodiment of the present invention utilizes the digit keys for designation of one of the user accessible memories 207 to be employed for a particular store or recall command. However, use of a plurality of alphabetic keys or other means to designate the particular user memory 207 to be employed are equally applicable to the present invention.

If it has been determined that a store command sequence has been entered then program 600 tests to determine whether the data processing apparatus is in a complex mode (decision block 603). In this regard it is important to note that the same procedure is required in either a rectangular mode or a polar mode. If it has been determined that the data processing apparatus is in a complex number computation mode then the data within the indicator memory is stored within the designated memory (processing block 604). In addition the data stored in the second memory is stored in another user memory 207 which is paired with the designated memory (processing block 605). Because storage of a complex number requires use of two user memories 207, it is advantageous to permit only some of the normal designators to be operable. In this case that permits the other now not permissible user memories 207 to be paired with the permitted user memories in order to allow storage of the two parts of the complex number. Thus if the apparatus normally permits access to 6 user memories via digit keys 0 to 5, then in complex mode only the digit keys 0 to 2 would be permitted. This allows the other user accessible memories to be paired with the addressable memories for complex number storage.

As a convenient design choice, the preferred embodiment includes an automatic conversion of polar form complex numbers to rectangular form upon entry of a store command sequence. This conversion is implemented in the same manner described above in conjunction with program 400 and for the same purpose of reducing required program storage area within read only memory 202.

In the event that the data processing apparatus is not in a complex mode, then program 600 stores the data stored in the indicator memory into the designated user memory (processing block 606). This is in accordance with the normal memory store sequence known in the art. After either a normal store operation or a complex number store operation, program 600 proceeds.

Program 600 next determines whether a recall command sequence including depression of recall key 118 and depression of a digit key for designating the user memory 207 has been received (decision block 607). In the event that such a recall command sequence has been received then program 600 tests to determine whether the data processing apparatus is in a complex mode (decision block 608). If the data processing apparatus is in a complex mode, then program 600 causes the data in the designated memory to be stored in the indicator memory (processing block 609) and for the data stored in the memory paired with the designated memory to be stored in the second memory (processing block 610). This function is analagous to the operation on a store command sequence when in the complex mode. Of course only some of the previously permitted memory designators may be allowed in a complex number computation mode in accordance with the technique noted above.

In the event that data processing apparatus 200 is not a complex mode, then program 600 causes the data stored in the designated memory to be stored in the indicator memory (processing block 611).

Program 600 next tests to determine whether an exchange command sequence has been entered (decision block 612). An exchange command sequence requires depression of exchange key 116 and depression of a digit key for designating the user memory 207. In the event an exchange command sequence has been received then program 600 tests to determine whether the data processing apparatus is in a complex mode (decision block 613). If the data processing apparatus is in a complex mode then program 600 causes the data in the indicator memory to be exchanged with the data in the designated memory (processing block 614) and for the data stored in the second memory to be exchanged with the data stored in the memory paired with the designated memory (processing block 616). This function is a combination of a store and a recall. As noted above, in the preferred embodiment an automatic conversion from polar complex number computation mode to rectangular complex number computation mode as illustrated in program 400 is desirable to reduce required program space. As described above in conjunction with the store command sequence, it is possible to limit the permitted memory designators to half the normally permitted memory designators in order to allow the unpermitted user accessible memories to be paired with the permitted user accessible memories.

In the event that the data processing apparatus 200 is not in a complex mode, then program 600 causes the data stored in the indicator memory to be exchanged with the data stored in the designated memory (processing block 616). In any event the program is then exited via exit block 617.

A further example of the type of operational command which may be redefined for complex numbers is memory arithmetic. This may be performed on direct memory arithmetic keys or upon the memory arithmetic functions disclosed in copending U.S. patent application Ser. No. 280,640 of Caldwell et al, entitled "Data Processing Apparatus with Algebraic Memory Operation and Entry Sequence", filed July 6, 1981.

Figure 7:
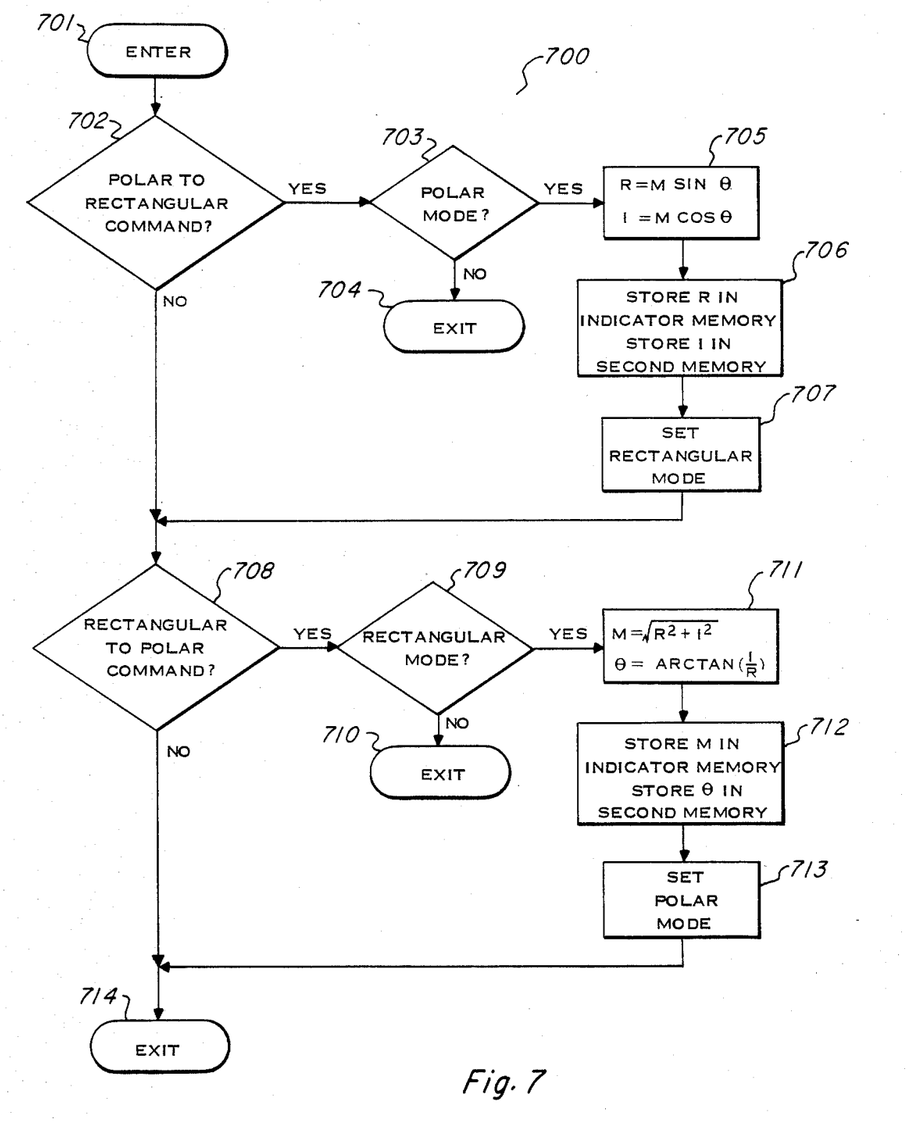
FIG. 7 illustrates a flow chart of the operation of a data processing apparatus in accordance with the present invention which provides conversion between rectangular and polar complex number modes.

In the preferred embodiment, in which the data processing apparatus selectively operates in either a rectangular complex number computation mode or in a polar complex number computation mode, a mode conversion between rectangular and polar modes is provided. FIG. 7 illustrates program 700 which implements this conversion. It is assumed in program 700 that the data processing apparatus is in a complex number computation mode due to previously entered commands. Program 700 is entered via entry block 701. Program 700 tests to determine whether a polar to rectangular conversion command has been received (decision block 702). Actuation of polar to rectangular conversion key 123 provides this operational command. If a polar to rectangular conversion command has been received, program 700 tests to determine whether the data processing apparatus is in the polar complex number computation mode (decision block 703). If the apparatus is not in polar mode, then the conversion command is meaningless and program 700 is exited (exit block 704). If the apparatus is in polar mode then the polar form complex number stored in the indicator memory and in the second memory is converted to rectangular form. This conversion takes place by assuming that the number stored in the indicator memory is the magnitude of a polar form complex number and that the number stored in the second memory is the angle part of a polar form complex number. This conversion takes place in accordance with the relationship between real part R and imaginary part I as noted above in conjunction with the automatic conversion upon entry of an operation (processing block 705). Thereafter the real part R is stored in the indicator memory and the imaginary part I is stored in the second memory (processing block 706). Next program 700 sets the data processing apparatus into rectangular mode (processing block 707).

Program 700 also tests to determine whether a rectangular to polar conversion command has been received (decision block 708). In the data processing apparatus illustrated in FIG. 1, generation of such a rectangular to polar conversion command requires the sequential depression of inverse key 124 (which in general is employed to define the next received key depression as the inverse of the ordinary operational) and polar to rectangular conversion key 123. This key sequence defines the inverse of polar to rectangular conversion, that is rectangular to polar conversion. If the rectangular to polar conversion command has been received then program 700 tests to determine if the data processing apparatus is in rectangular complex number computation mode (decision block 709). If not, program 700 is inapplicable because the conversion command is meaningless so program 700 is exited (exit block 710). If the apparatus is in rectangular mode then program 700 calculates the magnitude and angle part of a polar form complex number having the real part stored in the indicator memory and the imaginary part stored in the second memory (processing block 711). This conversion takes place in accordance with the following formula:

$$M = \sqrt{(R^2 + I^2)}$$

$$\theta = \arctan(I/R)$$

where M, R and I have been defined above. Additional tests of R and I may be required to resolve any quadrant ambiguity. Next program 700 stores the magnitude part M in the indicator memory and the angular part in the second memory (processing block 712). Lastly, this portion of program 700 sets the data processing apparatus in polar mode (processing block 713). If neither of the mode conversion commands has been received or once received has been performed then this portion of the total program of data processing apparatus 200 is exited via exit block 714.

What is claimed is:

1. A data processing apparatus comprising:
   operator input means for entering numeric data and operational commands, said operational commands including (a) a first set of at least one operational command corresponding to a data processing function permitting at least one complex number operand, and (b) at least one complex number mode designation command corresponding to a mode of complex number representation;
   indicator memory for storing data therein;
   output means connected to said indicator memory for generating an operator perceivable indication of said data stored in said indicator memory;
   second memory for storing data therein; and
   arithmetic means connected to said operator input means, said indicator memory and said second memory including (a) means for performing entered operational commands on entered numeric data in a real number mode and storing the result in said indicator memory when said data processing apparatus is not in a complex number computation mode, (b) means for designating the previously entered numeric data as a first part of a complex number and the next entered numeric data as a second part of a complex number in a corresponding mode of complex number representation, and setting a corresponding complex number computation mode upon entry of a complex number mode designation command, and (c) means for performing entered operational commands from said first set of at least one operational command on entered complex number numeric data in said corresponding mode of complex number computation and storing the first part of the result in said second memory and the second part of the result in said indicator memory when said data processing apparatus is in a complex number computation mode.

2. A data processing means as claimed in claim 1, wherein:
   said output means is further connected to said arithmetic means and further includes means for generating an operator perceivable indication when said arithmetic means is in a complex number computation mode.

3. A data processing apparatus as claimed in claim 1, wherein:
   said operational commands further includes an complex number exchange operational command; and
   said arithmetic means further includes means for exchanging the data stored in said indicator memory with the data stored in said second memory upon entry of said complex number exchange operational command when said data processing apparatus is in a complex number computation mode.

4. A data processing apparatus as claimed in claim 3, wherein:
   said complex number exchange operational command includes the sequential entry of an exchange operational command and said complex number mode designation command.

5. A data processing apparatus as claimed in claim 3, wherein:
   said output means is further connected to said arithmetic means and further includes means for generating an operator perceivable indication when data stored in said indicator memory and said second memory have been exchanged whereby said indicator memory stores said first part and said second memory stores said second part of a complex number.

6. A data processing apparatus as claimed in claim 1, wherein:
   said operational commands includes a memory store command, a memory recall command and at least two memory designation commands;
   said data processing apparatus further includes at least two user accessible memories connected to said arithmetic means, each user accessible memory corresponding to one and only one of said memory designation commands;
   said arithmetic means further comprising (a) means for storing the data stored in said indicator memory in a corresponding user accessible memory upon entry of a combination of operational commands including said memory store command and a memory designation command and for storing the data stored in a corresponding user accessible memory in said indicator memory upon entry of a combination of operational commands including said memory recall command and a memory designation command, when said data processing apparatus is not in a complex number computation mode, and (b) means for storing the data stored in said indicator memory in a corresponding user accessible memory and storing the data stored in said second memory in a user accessible memory paired with said corresponding user accessible memory upon entry of a combination of operational commands including said memory store command and a memory designation command and for storing the data stored in a corresponding user accessible memory in said indicator memory and storing the data stored in said user accessible memory paired with said corresponding user accessible memory upon entry of a combination of operational commands including said memory store command and a memory designation command when said data processing apparatus is in a complex computation mode.

7. A data processing apparatus as claimed in claim 6, wherein:
said at least one complex number mode designation command includes (a) a rectangular complex number mode designation command corresponding to a complex number having a real part and an imaginary part and to a rectangular complex number computation mode, and (b) a polar complex number mode designation corresponding to a complex number having a magnitude part and an angle part and to a polar complex number computation mode; and
said means for storing when in a complex number computation mode of said arithmetic means includes means for converting an entered complex number from said polar complex number mode to said rectangular complex number mode, entering said rectangular complex number computation mode and storing the respective parts of said converted complex number upon entry of a combination of operational commands including said memory store command and a memory designation command when said data processing apparatus is in said polar complex number computation mode.

8. A data processing apparatus as claimed in claim 6, wherein:
said operational commands further includes an exchange operational command; and
said arithmetic means further comprises (a) means for exchanging the data in said indicator memory with the data in a corresponding user accessible memory upon entry of a combination of operational commands including said exchange operational command and a memory designation command when said data processing apparatus is not in a complex number computation mode, and (b) means for exchanging the data in said indicator memory with the data in a corresponding user accessible memory and exchanging the data in said second memory with the data in a user accessible memory paired with said corresponding user accessible memory upon entry of a combination of operational commands including said exchange operational command and a memory designation command when said data processing is in a complex number computation mode.

9. A data processing apparatus as claimed in claim 8, wherein:
said at least one complex number mode designation command includes (a) a rectangular complex number mode designation command corresponding to a complex number having a real part and an imaginary part and to a rectangular complex number computation mode, and (b) a polar complex number mode designation command corresponding to a complex number having a magnitude part and an angle part and to a polar complex number computation mode; and
said means for exchanging when in a complex number computation mode of said arithmetic means includes means for converting an entered complex number from said polar complex number mode to said rectangular complex number mode, entering said rectangular complex number computation mode and exchanging the respective parts of said converted complex number with data in a designated user accessible memory and a user accessible memory paired therewith upon entry of a combination of operational commands including said exchange operation command and a memory designation command when said data processing apparatus is in said polar complex number computation moded.

10. A data processing apparatus as claimed in claim 1, wherein:
said at least one complex number mode designation command includes a rectangular complex number mode designation command corresponding to a complex number having a real part and an imaginary part and to a rectangular complex number computation mode.

11. A data processing apparatus as claimed in claim 10, wherein:
said first part of said complex number is the imaginary part and said second part of said complex number is the real part when said data processing apparatus is in said rectangular complex number computation mode.

12. A data processing apparatus as claimed in claim 11, wherein:
said at least one complex number mode designation command further includes a polar complex number mode designation command corresponding to a complex number having a magnitude part and an angle part and to a polar complex number computation mode; and
said arithmetic means further comprises means for converting an entered complex number from said polar complex number mode to said rectangular complex number mode and entering said rectangular complex number computation mode upon entry of one of said first set of operational commands when said data processing apparatus is in said polar complex number computation mode.

13. A data processing apparatus as claimed in claim 1, wherein:
said at least one complex number mode designation command includes a polar complex number more designation command corresponding to a complex number having a magnitude part and an angle part and to a polar complex number computation mode.

14. A data processing apparatus as claimed in claim 13, wherein:
said first part of said complex number is the angle part and said second part of said complex number is the magnitude part when said data processing apparatus is in said polar complex number computation mode.

15. A data processing apparatus as claimed in claim 1, wherein:
said means for designating of said arithmetic means includes means for storing entered numeric data in said indicator memory and means for storing the data stored in said indicator memory in said second memory and clearing said indicator memory upon entry of a complex number mode designation command.

16. A method of operating a data processing apparatus having an input means for receiving operator inputs of numeric data and operational commands, an arithmetic means for performing entered operational commands on entered numeric data and an output means for generating an operator perceivable indication of the results of said operational commands, said method comprising:
a. entering via said input means at least one complex number by sequentially
  i. entering via said input means the first part of said complex number;
  ii. entering via said input means a complex number mode designation command, thereby defining the mode of complex number of expression and the mode of complex number computation;
  iii. entering via said input means the second part of said complex number; and
b. performing via said arithmetic means entered operational commands on said complex number in said defined complex number computation mode.

17. The method as claimed in claim 16, wherein:
said complex number mode designation command includes at least a polar complex number mode designation command wherein said first part of said entered complex number is the angle part and said second part of said entered complex number is the magnitude part.

18. The method claimed in claim 16, further comprising:
generating via said output means an operator perceivable indication of said corresponding complex number computation mode.

19. The method claimed in claim 16, further comprising:
generating via said output means an operator perceivable indication of a selected part of said entered complex number; and
generating via said output means an operator perceivable indication of the other part of said entered complex number upon entry via said input means of a complex number exchange command.

20. The method claimed in claim 19, wherein:
said complex number exchange command includes the sequential entry of an exchange command and said complex number mode designation command.

21. The method as claimed in claim 16, wherein said data processing apparatus further includes at least two user accessible memories, further comprising:
storing via said arithmetic means said first part of said entered complex number in a user accessible memory designated by a memory designation command entered via said input means and storing via said arithmetic means said second part of said entered complex number in a user accessible memory paired with said designated user accessible memory upon entry via said input means of a memory store command; and
recalling via said arithmetic means said first part of said entered complex number from a user accessible memory designated by a memory designation command entered via said input means and recalling via said arithmetic means said second part of said entered complex number from a user accessible memory paired with said designated user accessible memory upon entry via said input means of a memory recall command.

22. The method as claimed in claim 21, wherein:
said entering said complex number mode designation command includes (a) entering a rectangular complex number mode of expression and a rectangular complex number computation mode upon entry via said input means of a rectangular complex number mode designation command, and (b) entering a polar complex number mode of expression and a polar complex number computation mode upon entry via said input means of a polar complex number mode designation command; and
said storing step includes converting an entered complex number from said polar complex number mode of expression to said rectangular complex number mode of expression, defining said rectangular complex number computation mode and storing said converted complex number when in said polar complex number computation mode.

23. A method as claimed in claim 21, further comprising:
exchanging via said arithmetic means said first part of said entered complex number with the data stored in said user accessible memory designated by a memory designation command entered via said input means and exchanging via said arithmetic means said second part of said entered complex number with the data stored in said user accessible memory paired with said designated user accessible memory upon entry via said input means of the exchange command.

24. The method as claimed in claim 23, wherein:
said entering said complex number mode designation command includes (a) entering a rectangular complex number mode of expression and a rectangular complex number computation mode upon entry via said input means of a rectangular complex number mode designation command, and (b) entering a polar complex number mode of expression and a polar complex number computation mode upon entry via said input means of a polar complex number mode designation command; and
said exchanging step includes converting an entered complex number from said polar complex number mode of expression to said rectangular complex number mode of expression, defining said rectangular complex number computation mode and exchanging said converted complex number when in said polar complex number computation mode.

25. The method as claimed in claim 16, wherein:
said complex number mode designation command includes at least a rectangular complex number mode designation command wherein said first part of said entered complex number is the imaginary part and said second part of said entered complex number is the real part.

* * * * *